(12) United States Patent
Diller et al.

(10) Patent No.: US 8,380,709 B1
(45) Date of Patent: Feb. 19, 2013

(54) METHOD AND SYSTEM FOR RANKING USERS

(75) Inventors: Jonathan Paul Diller, Soquel, CA (US); Sunny SunMin Song, Los Altos, CA (US); Harish Bal Kotbagi, Foster City, CA (US)

(73) Assignee: Elance, Inc., Mountain View, CA (US)

( * ) Notice: Subject to any disclaimer, the term of this patent is extended or adjusted under 35 U.S.C. 154(b) by 540 days.

(21) Appl. No.: 12/287,994

(22) Filed: Oct. 14, 2008

(51) Int. Cl.
*G06F 7/00* (2006.01)
*G06F 17/30* (2006.01)

(52) U.S. Cl. ...................................... 707/723

(58) Field of Classification Search .................. 707/706, 707/723, 740, 722; 705/7, 26, 35
See application file for complete search history.

(56) References Cited

U.S. PATENT DOCUMENTS

| | | | |
|---|---|---|---|
| 4,703,325 A | 10/1987 | Chamberlin et al. |
| 4,799,156 A | 1/1989 | Shavit et al. |
| 5,008,853 A | 4/1991 | Bly et al. |
| 5,548,506 A | 8/1996 | Srinivasan |
| 5,557,515 A | 9/1996 | Abbruzzese et al. |
| 5,592,620 A | 1/1997 | Chen et al. |
| 5,664,115 A | 9/1997 | Fraser |
| 5,715,402 A | 2/1998 | Popolo |
| 5,732,400 A | 3/1998 | Mandler et al. |
| 5,794,207 A | 8/1998 | Walker et al. |
| 5,835,896 A | 11/1998 | Fisher et al. |
| 5,842,178 A | 11/1998 | Giovannoli |
| 5,862,223 A | 1/1999 | Walker et al. |
| 5,905,975 A | 5/1999 | Ausubel |
| 5,924,082 A | 7/1999 | Silverman et al. |
| 5,949,976 A | 9/1999 | Chappelle |
| 5,956,715 A | 9/1999 | Glasser et al. |
| 5,966,130 A | 10/1999 | Benman, Jr. |
| 5,987,498 A | 11/1999 | Athing et al. |
| 6,009,154 A | 12/1999 | Rieken et al. |
| 6,041,307 A | 3/2000 | Ahuja et al. |
| 6,049,777 A | 4/2000 | Sheena et al. |
| 6,061,665 A | 5/2000 | Bahreman |

(Continued)

FOREIGN PATENT DOCUMENTS

| EP | 0 952 536 A1 | 10/1999 |
| WO | WO 01/15050 A1 | 3/2001 |

(Continued)

OTHER PUBLICATIONS

Author: Majithia et al.; Title: Reputation-based Semantic Service Discovery; Date: 2004; pp. 1-6.*

(Continued)

*Primary Examiner* — Usmaan Saeed
*Assistant Examiner* — Md I Uddin
(74) *Attorney, Agent, or Firm* — Haverstock & Owens, LLP

(57) ABSTRACT

A method of and system for ranking users by reputation enables better searching for a service provider. Service providers are also forced to conform to reputation requirements since they are published. The reputation requirements include reviews, earnings, duration on a site, recent visits and other components that are able to establish a user's reputation. The components are also weighted so that more important factors count more towards a user's reputation. By combining a search score and a reputation score, a total score is determined which is used to generate a list of results ordered based on the total score.

34 Claims, 5 Drawing Sheets

U.S. PATENT DOCUMENTS

| | | | |
|---|---|---|---|
| 6,064,980 | A | 5/2000 | Jacobi et al. |
| 6,078,906 | A | 6/2000 | Huberman |
| 6,092,049 | A | 7/2000 | Chislenko et al. |
| 6,101,482 | A | 8/2000 | DiAngelo et al. |
| 6,119,101 | A | 9/2000 | Peckover |
| 6,128,624 | A | 10/2000 | Papierniak et al. |
| 6,141,653 | A | 10/2000 | Conklin et al. |
| 6,154,731 | A | 11/2000 | Monks et al. |
| 6,161,099 | A | 12/2000 | Harrington et al. |
| 6,223,177 | B1 | 4/2001 | Tatham et al. |
| 6,226,031 | B1 | 5/2001 | Barraclough et al. |
| 6,233,600 | B1 | 5/2001 | Salas et al. |
| 6,311,178 | B1 | 10/2001 | Bi et al. |
| 6,336,105 | B1 | 1/2002 | Conklin et al. |
| 6,374,292 | B1 | 4/2002 | Srivastava et al. |
| 6,415,270 | B1 | 7/2002 | Rackson et al. |
| 6,442,528 | B1 | 8/2002 | Notani et al. |
| 6,484,153 | B1 | 11/2002 | Walker et al. |
| 6,557,035 | B1 | 4/2003 | McKnight |
| 6,564,246 | B1 | 5/2003 | Varma et al. |
| 6,567,784 | B2 | 5/2003 | Bukow |
| 6,598,026 | B1 | 7/2003 | Ojha et al. |
| 6,832,176 | B2 | 12/2004 | Hartigan et al. |
| 6,859,523 | B1 | 2/2005 | Jilk et al. |
| 6,871,181 | B2 | 3/2005 | Kansal |
| 7,069,242 | B1 | 6/2006 | Sheth et al. |
| 7,096,193 | B1 | 8/2006 | Beaudoin et al. |
| 7,310,415 | B1 | 12/2007 | Short |
| 7,406,443 | B1 | 7/2008 | Fink et al. |
| 1,287,997 | A1 | 10/2008 | Diller et al. |
| 7,437,327 | B2 | 10/2008 | Lam et al. |
| 7,466,810 | B1 | 12/2008 | Quon et al. |
| 7,587,336 | B1 | 9/2009 | Wallgren et al. |
| 8,024,225 | B1 | 9/2011 | Sirota et al. |
| 2001/0011222 | A1 | 8/2001 | McLauchlin et al. |
| 2001/0032170 | A1 | 10/2001 | Sheth |
| 2001/0034688 | A1 | 10/2001 | Annunziata |
| 2001/0041988 | A1 | 11/2001 | Lin |
| 2002/0010685 | A1 | 1/2002 | Ashby |
| 2002/0023046 | A1 | 2/2002 | Callahan et al. |
| 2002/0026398 | A1 | 2/2002 | Sheth |
| 2002/0032576 | A1 | 3/2002 | Abbott et al. |
| 2002/0120522 | A1 | 8/2002 | Yang |
| 2002/0120554 | A1 | 8/2002 | Vega |
| 2002/0129139 | A1 | 9/2002 | Ramesh |
| 2002/0133365 | A1* | 9/2002 | Grey et al. .......................... 705/1 |
| 2002/0194077 | A1 | 12/2002 | Dutta |
| 2003/0046155 | A1 | 3/2003 | Himmel et al. |
| 2003/0055780 | A1 | 3/2003 | Hansen et al. |
| 2003/0101126 | A1 | 5/2003 | Cheung et al. |
| 2003/0191684 | A1 | 10/2003 | Lumsden et al. |
| 2004/0063463 | A1 | 4/2004 | Boivin |
| 2004/0122926 | A1* | 6/2004 | Moore et al. .................. 709/223 |
| 2004/0128224 | A1 | 7/2004 | Dabney et al. |
| 2005/0043998 | A1 | 2/2005 | Bross et al. |
| 2005/0222907 | A1 | 10/2005 | Pupo |
| 2006/0031177 | A1 | 2/2006 | Rule |
| 2006/0095366 | A1 | 5/2006 | Sheth et al. |
| 2006/0122850 | A1 | 6/2006 | Ward et al. |
| 2006/0136324 | A1 | 6/2006 | Barry et al. |
| 2006/0155609 | A1 | 7/2006 | Caiafa |
| 2006/0212359 | A1 | 9/2006 | Hudgeon |
| 2007/0027746 | A1 | 2/2007 | Grabowich |
| 2007/0027792 | A1 | 2/2007 | Smith |
| 2007/0067196 | A1 | 3/2007 | Usui |
| 2007/0078699 | A1* | 4/2007 | Scott et al. ....................... 705/10 |
| 2007/0162379 | A1 | 7/2007 | Skinner |
| 2007/0174180 | A1 | 7/2007 | Shin |
| 2007/0192130 | A1 | 8/2007 | Sandhu |
| 2007/0233510 | A1 | 10/2007 | Howes |
| 2008/0059523 | A1 | 3/2008 | Schmidt et al. |
| 2008/0065444 | A1 | 3/2008 | Stroman et al. |
| 2008/0082662 | A1 | 4/2008 | Dandliker et al. |
| 2008/0109491 | A1 | 5/2008 | Gupta |
| 2008/0154783 | A1 | 6/2008 | Rule et al. |
| 2008/0187114 | A1 | 8/2008 | Altberg et al. |
| 2008/0294631 | A1 | 11/2008 | Malhas et al. |
| 2009/0011395 | A1 | 1/2009 | Schmidt et al. |
| 2009/0017788 | A1 | 1/2009 | Doyle et al. |
| 2009/0055404 | A1 | 2/2009 | Heiden et al. |
| 2009/0177691 | A1* | 7/2009 | Manfredi et al. .......... 707/104.1 |
| 2009/0210282 | A1 | 8/2009 | Elenbaas et al. |
| 2009/0234706 | A1 | 9/2009 | Adams et al. |
| 2009/0287592 | A1 | 11/2009 | Brooks et al. |
| 2010/0017253 | A1 | 1/2010 | Butler et al. |
| 2010/0115040 | A1 | 5/2010 | Sargent et al. |
| 2011/0238505 | A1 | 9/2011 | Chiang et al. |

FOREIGN PATENT DOCUMENTS

| | | |
|---|---|---|
| WO | WO 01/73645 | 10/2001 |
| WO | WO 02/061531 A2 | 8/2002 |

OTHER PUBLICATIONS

Author: Xu et al.; Tile: Reputation-Enhanced QoS-based Web Services Discovery; Date: 2007; pp. 1-8.*

Author: Massimo Paolucci et al.; Title: Semantic Matching of Web Services Capabilities; Published date: 2002; Publisher: Springer-Verlag Berlin Heidelberg 2002; pp. 1-15.*

Davenport, Thomas H. and Keri Pearlson, "Two Cheers for the Virtual Office", summer 1998, abstract, retrieved from the Internet: <URL: http://www.pubservice.com/MSStore?ProductDetails.aspx?CPC=3944>.

PCT International Search Report and Written Opinion, PCT/US06/22734, Jun. 3, 2008, 5 pages.

U.S. Appl. No. 60/206,203, filed May 22, 2000, Anumolu et al.

U.S. Appl. No. 60/999,147, filed Oct. 15, 2007, Diller et al.

U.S. Appl. No. 61/131,920, filed Jun. 12, 2008, Diller et al.

U.S. Appl. No. 09/644,665, filed Aug. 24, 2000, Sheth et al.

ants.com web pages [online]. Ants.com [retrieved on Aug. 22, 2008]. Retrieved from the Internet: <URL: http://www.ants.com/ants/>.

bizbuyer.com web pages [online]. BizBuyer.com, Inc. [retrieved Aug. 18-21, 2000]. Retrieved from the Internet: <URL: http://www.bizbuyer.com/>.

BullhornPro web pages [online]. Bullhorn, Inc. [retrieved on Jan. 4, 2001]. Retrieved from the Internet: <URL: http://www.bullhornpro.com/>.

Cassidy, M., "Going for Broke," San Jose Mercury News, Monday, Aug. 16, 1999, pp. 1E and 4E, published in San Jose, CA.

efrenzy.com web pages [online]. eFrenzy, Inc. [retrieved on Aug. 22, 2000]. Retrieved from the Internet: <URL: http://www.efrenzy.com/index.isp>.

Eisenberg, D., "We're for Hire, Just Click," Time Magazine, Aug. 16, 1999, vol. 154, No. 7 [online] [retrieved on Aug. 19, 1999]. Retrieved from the Internet: <URL: http://www.pathfinder.com/time/magazine/articles/0,3266,29393,00.html>.

eworkexchange.com web pages [online]. eWork Exchange, Inc. [retrieved on Aug. 18-22, 2000]. Retrieved from the Internet: <URL: http://www.eworks.com/>.

eWork Exchange web pages [online]. eWork Exchange, Inc. [retrieved on Jan. 5, 2001]. Retrieved from the Internet: <URL: http://www.eworks.com/>.

eWork ProSource web pages [online]. eWork Exchange, Inc. [retrieved on Jan. 3, 2001]. Retrieved from the Internet: <URL: http://www.ework.com/>.

FeeBid.com web pages [online]. FeeBid.com [retrieved on Dec. 18, 2000]. Retrieved from the Internet: <URL: http://www.feebid.com>.

freeagent.com web pages [online]. FreeAgent.com [retrieved Aug. 18-22, 2000]. Retrieved from the Internet: <URL: http://www.freeagent.com/>.

guru.com.com web pages [online]. Guru.com, Inc. [retrieved Aug. 18, 2000]. Retrieved from the Internet: <URL: http://www.guru.com/>.

Herhold, S., "Expert Advice is Collectible for Start-up," San Jose Mercury News, Monday, Aug. 16, 1999, pp. 1E and 6E, San Jose, CA.

hotdispatch.com web pages [online]. HotDispatch, Inc. [retrieved on Aug. 22, 2000]. Retrieved from the Internet: <URL: http://www.hotdispatch.com/>.

Humphreys, Paul et al., "A Just-in-Time Evaluation Strategy for International Procurement," MCB UP Limited, 1998, pp. 1-11.

"IBNL Forges Into the Future of Buying and Selling with Source Interactive Software," PR Newswire, Jan. 10, 1996. [replacement copy retrieved on May 4, 2009]. Retrieved from Internet: <URL: http://www.highbeam.com>.

imandi.com web pages [online]. Imandi Corporation [retrieved on Aug. 22, 2000]. Retrieved from the Internet: <URL: http://www.imandi.com/>.

Malone, Thomas W. et al., "The Dawn of the E-Lance Economy," Harvard Business Review, Sep.-Oct. 1998, pp. 145-152.

"Netscape Selects Netopia as the Exclusive 'Virtual Office' Offering on the New Netscape Small Business Source Service," PR Newswire, May 11, 1998, Mountain View and Alameda, California.

onvia.com web pages [online]. Onvia.com [retrieved Aug. 22, 2000]. Retrieved from the Internet: <URL: http://www.onvia.com/usa/home/index.cfm>.

Opus360 web pages [online]. Opus360 Corporation [retrieved on Jan. 3, 2001] Retrieved from the Internet: <URL: http://www.opus360com/>.

smarterwork.com web pges [online]. smarterwork.com, Inc. [retrieved on Aug. 22, 2000]. Retrieved from the Internet: <URL: http://www.smarterwork.com/>.

workexchange.com web pages [online]. WorkExchange, Inc. [retrieved Aug. 22, 2000]. Retrieved from the Internet: <URL: http://www.workexchange.com/unique/workexchange/index1.cfm>.

Non-Final Office Action dated Nov. 8, 2010, U.S. Appl. No. 12/476,039, filed Jun. 1, 2009, Ved Ranjan Sinha et al.

madbid.com. <http://web.archive.org/eb/20080829025830http://uk.madbid.com/faq/>.

Non-Final Office Action dated Feb. 13, 2012, U.S. Appl. No. 12/755,304, filed Apr. 6, 2010, Jonathan Paul Diller et al.

morebusiness.com, "How to Write Winning Business Proposals: Writing Strategies," Office Action dated Oct. 6, 2011, <http://www.morebusiness.com/running_your_business/management/v1n11.brc>, published Aug. 1, 1998.

Office Action dated Jul. 11, 2012, U.S. Appl. No. 12/755,304, filed Apr. 6, 2010, 22 pages.

Office Action dated Sep. 19, 2012, U.S. Appl. No. 12/476,039, filed Jun. 1, 2009, Ved Ranjan Sinha et al.

* cited by examiner

Elance

| | | | |
|---|---|---|---|
| Find Professionals | Find Work | MyElance | Water Cooler | ajax  [Providers ▼] [Search]  [Invite to Bid ⇕]  [Post Your Project]

104

102  Results 1 - 25 of 1,798 for "ajax"

Refine Results

| Name | Location \| Min Rate | Feedback \| Earnings |
|---|---|---|
| Escripts1234<br>PHP \| AJAX \| ASP.NET \| Web 2.0 \| XML \| Flash  ⎫<br>Website Dev.   Save \| Portfolio                         ⎬ 106 | India<br>Rajasthan, Jaipur<br>$12/hr min rate | Feedback: 100% positive<br>Reviews: 30<br>Earnings: $159,875 |
| MAndyM<br>OO Perl \| PHP \| DHTML \| AJAX \| XML \| MySQL \| Postgres<br>Website Dev.   Save \| Portfolio | Ukraine<br>Postgres UA, Kiev, Odessa<br>$15/hr min rate | Feedback: 98% positive<br>Reviews: 4<br>Earnings: $6,043 |
| SoftR<br>AJAX \| Java \| .Net \| Oracle \| MySql \| Postgres<br>Software & Technology   Save \| Portfolio | Bangladesh<br>Dhaka, Dhaka<br>$15/hr min rate | Feedback: 86% positive<br>Reviews: 7<br>Earnings: $1,509 |

108

Category
All Catgories (1,798)
- Website Dev. (940)
- Software Dev. (459)
- Graphic Design (171)
- Admin. Support (171)
- Translation (48)
- Sales & Marketing (45)
- Multimedia (24)
- Engineering (22)
- Training(22)
- Management(24)
- Legal (4)

Feedback (6 mos):   Reviews (6 mos):   Hourly Rate Up To:   Location
Any                 Any                Any                  City, State or Country:  [____] [Go]

Type
All Providers (1,798)
- Businesses (1,387)
- Individuals (411)

Fig. 1

Escripts1234
PHP|AJAX|ASP.NET|Web 2.0|XML|Flash  ~202
Profile | Portfolio | Feedback Minimum Hourly Rate: $12/hr
Location: India Summary ~204
Since 2003, we have worked hard on many online and software development projects. We focus on PHP, AJAX, ASP.NET and XML.

Website Development Experience ~206
Web Programming (69)
Web Design (48)
Ecommerce Website (12)

Skills ~210   Self-rated   Experience

| Skill | Self-rated | Experience |
|---|---|---|
| ASP, NET | ▭▭▭▭▭▭▭▭ | 3 years |
| XHTML 1.0 | ▭▭▭▭▭▭▭▭ | 2 years |
| PHP5 | ▭▭▭▭▭▭▭▭ | 3 years |
| MySQL | ▭▭▭▭▭▭▭▭ | 4 years |
| AJAX | ▭▭▭▭▭▭▭▭ | 3 years |
| JavaScript 1.3 | ▭▭▭▭▭▭▭▭ | 5 years |

Feedback

| | Last 6 months | Website Dev. | All Categories |
|---|---|---|---|
| Feedback: | | 100% Positive | 100% Positive |
| Reviews: | | 24 | 30 |
| Projects: | | 55 | 65 |
| Earnings: | | $78,703 | $88,803 |
| Lifetime Earnings: | | $129,775 | $159,875 |

Keyword Tags
• Video Sharing Website    • Dating website
• Ecommerce               • Web Design        ~208
• AJAX                    • .NET
• PHP Custom About Us ~212

Profile Type: Business
Year Founded: August 8, 2002
Number of Employees: 90

Escripts1234 has been creating high-quality web applications for over 5 years. We have developed into a company focused on Ecommerce, Web application development, Web designing and SEO.

Based on our significant experience in the IT business, we have formulated our development policies towards producing high-quality solutions for reasonable costs. Here are some of our main priniciples:
- Detailed proposals  - Expert management  - Comprehensive design specifications for all projects
- High quality graphic design  - Extensive testing by our in-house Testing Laboratory Payment Terms
30% up-front; 40% after we show you approximately half of the work done on our server; and remaining 30% after we show you completed work but before delivery.

Detailed Service Description ~214
Since 2002 we have worked closely with our clients and their customers to ensure they leverage the highest measurable benefit and return on investment for their online and software development projects.

Our broad service offering covers the following areas:

Web Site Design & Development -
We provide a comprehensive range of highly affordable web site development services, ranging from small, static web sites to large, database-driven e-commerce sites.

Credentials ~216
Certifications
Sun Microsystems, SCJP For the JAVA2 Platform, Awarded: 2002

References
Bob Smith - Personal Reference
React Services, Director

Fig. 2

| 305 Customer Satisfaction Components | 310 Component Weight | 315 Relative Ranking | 320 Max Possible | 325 Final Contribution |
|---|---|---|---|---|
| 1. Average Six Months Feedback | 50% | 99% | 12.5% | 12.4% |
| 2. Average All Time Feedback | 30% | 99% | 7.5% | 7.4% |
| 3. Percent Repeat | 10% | 17% | 2.5% | 0.4% |
| 4. Number of Feedback | 10% | 30% | 2.5% | 0.8% |
|  | 100% |  | 25% | 21.0% ~330 |

335 — row 1; 340 — row 2; 345 — row 3; 350 — row 4

Fig. 3

| 405 Earnings Components | 410 Component Weight | 415 Relative Percentile | 420 Max Possible | 425 Final Contribution |
|---|---|---|---|---|
| 1. Six Months Earnings | 60% | 100% | 39% | 39% |
| 2. All Time Earnings | 40% | 100% | 26% | 26% |
|  | 100% |  | 65% | 65% ~430 |

435 — row 1; 440 — row 2

Fig. 4

| 505 Participation Components | 510 Component Weight | 515 Relative Position | 520 Max Possible | 525 Final Contribution |
|---|---|---|---|---|
| 1. Number of Violations Verified | 33.3% | 0% | 3.3% | 0.0% |
| 2. Number of Credentials Verified | 33.3% | 100% | 3.3% | 3.3% |
| 3. Number of Skills Tested Positively | 33.3% | 0% | 3.3% | 0.0% |
|  | 100% |  | 10% | 3.3% ~530 |

535 — row 1; 540 — row 2; 545 — row 3

Fig. 5

METHOD AND SYSTEM FOR RANKING USERS

FIELD OF THE INVENTION

The present invention relates to the field of computing. More specifically, the present invention relates to the field of ranking users of an online service buyer/provider website.

BACKGROUND OF THE INVENTION

The Internet has continued to grow from an information sharing tool for the government and universities to a commercially viable E-commerce marketplace used by a significant portion of society. Not only are people able to purchase products online, but they are also able to purchase services. Thus, a service can be obtained by engaging an independent service provider without requiring the addition of an employee. For example, if a company wants to engage a programmer to design a web site for them, the company does not simply hold office interviews and hire someone. Instead, certain web sites provide users with the ability to post their expertise and companies with the ability to post jobs that need to be performed. One leading example of such a website is elance.com. Depending on the site, users and companies form an agreement where one provides a service and the other pays for and receives the result of that service (e.g. a completed web site). ELANCE is a registered trademark of Elance, Inc. of Mountain View, Calif.

As with most web sites, this site and competitive sites that provide service buyers and service providers a meeting ground, contain a significant amount of data. The ability to organize the data properly can impact user satisfaction. For example, a site that lists service providers alphabetically by name would present a significant disadvantage for someone with a name towards the end of the alphabet such as Zeb Zimmerman. If the site only had 5 service providers, the problem would be minimal. However, for sites which have many hundreds or thousands of service providers, a better method of listing the service providers is needed.

Some methods have been implemented to sort the data and provide it in a more useful manner to users. U.S. Pat. No. 6,871,181 to Kansal teaches a method for assessing, scoring, ranking and rating technology vendors for the purpose of comparing vendor bids on a project. A score or ranking is developed for each of the vendors based upon the vendor's historical reliability as well as normalizing the vendor's ranking with respect to the other vendors for the purpose of determining the appropriate vendor. U.S. Patent App. No. 2006/0212359 to Hudgeon teaches ratings based on performance attributes such as service quality, timeliness and cost. Sites such as rentacoder.com and guru.com also use ratings which organize service providers. Rentacoder.com uses an equation which sums the cost of each job times the adjusted rating of each job minus each missed status report value. Guru.com ranks users by category and then based on feedback and money earned.

While the ranking schemes above are helpful in organizing data related to service providers on web sites, there are shortcomings which need to be addressed.

SUMMARY OF THE INVENTION

A method of and system for ranking users by reputation enables better searching for a service provider. Service providers are also motivated to conform to reputation requirements since they are published. The reputation requirements include reviews, earnings, duration on a site, recent visits and other components that are able to establish a user's reputation. The components are also weighted so that more important factors count more towards a user's reputation.

In one aspect, a method of searching on a computing device for a service provider to provide a service. The method includes searching for one or more skills. The skills are matched the one or more skills with text within service provider profiles. The matching operation produces search scores. Reputation scores are calculated based on reputation data within service provider profiles. Typically, a final contribution value is associated with each of the reputation data; the final contribution is dependent on a component weight and a category weight. A list of service providers is generated which is based on the search scores and reputation scores.

In another aspect, a system for presenting a list of service providers to perform a task. The system includes a processor and an application executed by the processor. The application is for searching for one or more skills, matching the one or more skills with text within service provider profiles to produce search scores, calculating reputation scores based on reputation data within the service provide profiles, and generating a list of service providers based on the search scores and reputation scores. Typically, a final contribution value is associated with each of the reputation data; the final contribution is dependent on a component weight and a category weight. The application is executed online.

The search scores are based on matches between the one or more skills and the text. The matches can be weighted. The matches can be weighted more when a skill of the one or more skills is within a predetermined preferred section. The preferred sections can be one of a tagline section, a skills section, a keyword tag section, an experience section and a credentials section. The matches can be weighted less when a skill of the more or more skills in within a predetermined non-preferred section. The non-preferred sections can be one of a description section, a summary section and an 'about us' section. The preferred and non-preferred sections can be determined by the website administrator or selected by the users. The search scores and the reputation scores are weighted equally or differently. The reputation data comprise components including feedback data, review data, earnings data, duration data, visitation data and project completion data. A portion of the components are correlated in determining the reputation scores. Reputation components are weighted equally or differently. In some embodiments, the reputation components are grouped into categories. The categories are weighted equally or differently. Each reputation component and at least a portion of the service provider profiles is displayed within the list of service providers. Each reputation component is viewable by the service providers, buyers, and other users. The list of service providers is ordered, such as in descending order with the service provider with a highest combination of the search scores and the reputation scores atop the list of service providers. The list of service providers is viewable by the service providers. The method further comprises refining the list of service providers.

Yet, in another aspect, a method of providing a list of service providers on a computing device. The method includes accessing a database of service providers profiles and determining a reputation score for each service provider. A first user interface is provided to allow entry of one or more skills. The one or more skills are matched to the database of service provider profiles to produce a search score for each service provider. Reputation scores are calculated based on reputation data. Typically, a final contribution value is associated with each of the reputation data; the final contribution is dependent on a component weight and a category weight. A list of service providers is generated based on search scores and reputation scores. The search scores are based on weighted matches of the one or more skills and the text within the service provider profiles. The reputation scores are based on reputation data within the service provider profiles. The list of service providers is displayed. A second user interface is provided to allow refining a list of service providers.

Yet, in another aspect, a method of calculating a reputation score on a computing device. The method includes categorizing feedback components. A category weight is assigned for each category. For each component within a category, a component contribution score is determined by multiplying together the category weight, a component weight, and a relative ranking value. For each category, a category contribution score is calculated by adding together component contribution scores within a category. The method further includes adding together category contribution scores to determine the reputation score.

BRIEF DESCRIPTION OF THE DRAWINGS

FIG. 1 illustrates a web page displaying search results in accordance with the present invention.

FIG. 2 illustrates a web page of a profile in accordance with the present invention.

FIGS. 3-5 illustrate tables of exemplary categories that make up a reputation score in accordance with the present invention.

DETAILED DESCRIPTION OF THE INVENTION

Figure 6:
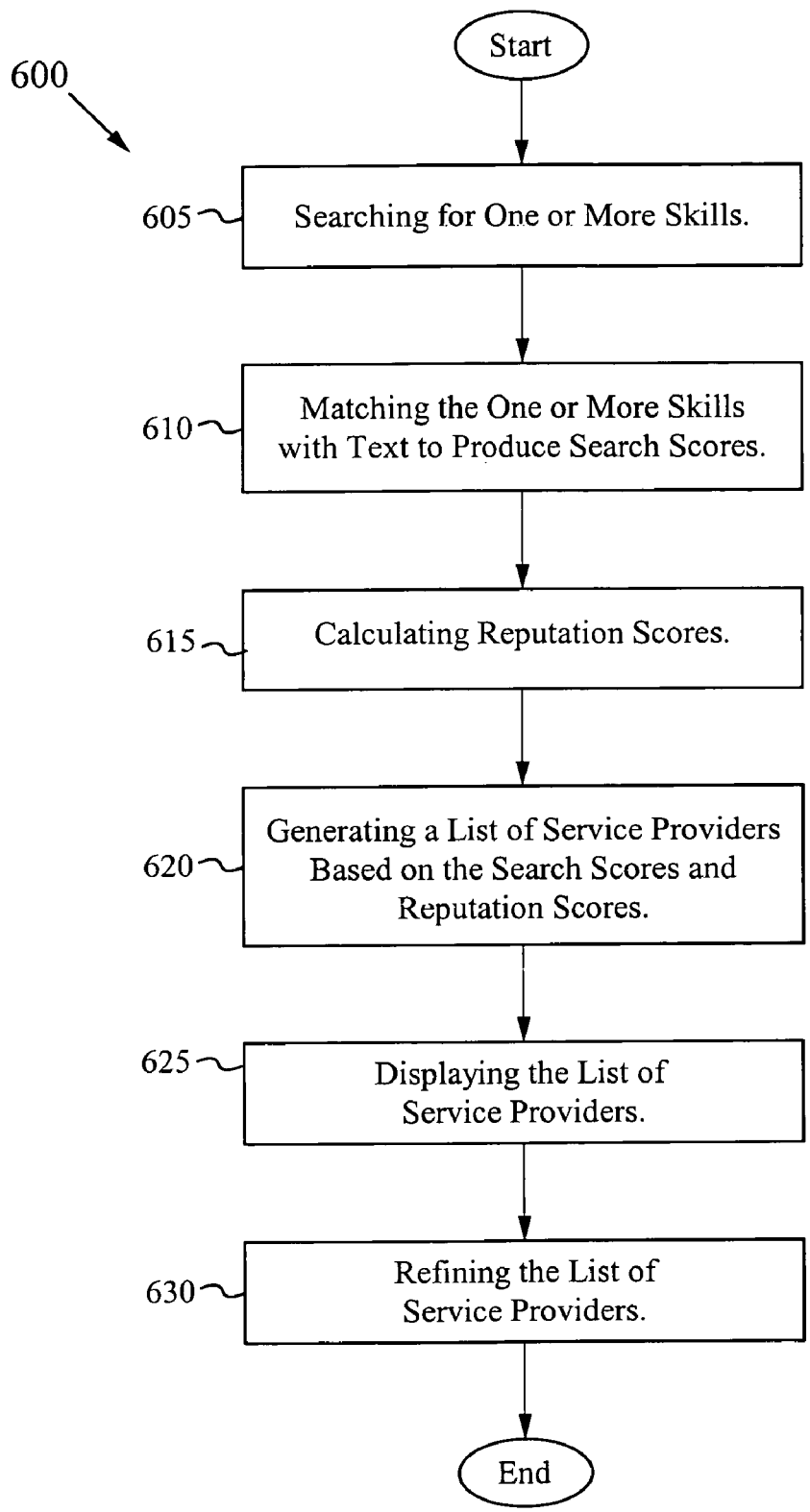
FIG. 6 illustrates a flowchart of a method of searching for a service provider in accordance with the present invention.

A method of and system for ranking users as a function of reputation encourages users to maintain a high reputation, which in turn, forces users to perform appropriately to achieve the high reputation. The reputation is able to be based upon a number of factors or components including, but not limited to, content of reviews (e.g. good service, bad service or more specific details), quantity of reviews, earnings, duration on a site, visitation quantity and so on. The reputation of the service provider is also able to be weighted so that more important factors have more weight in determining a user's reputation. Once user reputations are established, the users are able to be ordered based on their reputation. In some embodiments, reputation is utilized in conjunction with search results for determining an order for the user listings.

FIG. 1 illustrates a web page 100 displaying search results in accordance with the present invention. As is well known, the appearance of a web page can be altered according to a variety of requirement for displaying information and for aesthetic reasons. Thus, the web page 100 is merely one example of a web page according to the present invention. The web page 100 includes a search component 102 which allows a user to search a web site content for textual similarities. In some embodiments, the search component 102 includes a text box for entering text, a drop-down menu for selecting which type of users to search through and a command button for initiating the search.

For example, if the user wants to search through service providers, the user selects "providers" in the drop-down menu. The drop-down menu is able to include any set of profiles to search through, for example, service providers and projects. If the user then wants to search for service providers that have experience with the Ajax programming language, the user types "ajax" in the text box. Then, the user presses "enter" or clicks on the command button to begin the search.

The search operation functions by searching for matches through text in service provider profiles. FIG. 2 illustrates an exemplary service provider profile. Like the web page 100 of FIG. 1, the appearance of the service provider profile of FIG. 2 can be modified to display different information and/or for aesthetic reasons. Thus, the service provider profile of FIG. 2 is merely exemplary. The search examines the text in each service provider profile and determines if there is at least one match between the search term/phrase and the text. A search score is determined for the result of the search of each service provider. The search score of the result depends on the number of matches and where the match or matches are located as is described further below. If there are no matches for a service provider, that service provider will not be listed in the results or will likely be very low on the list. The search then generates a list of service providers partially based on the values produced by the search.

The search results include the name of the service provider, service provider profile data 106 and other pertinent data. The profile data 106 includes tagline data and company category as well as links to further data. The links are preferably "clickable" links. In addition to search results displayed in the list of search providers, reputation data 108 is also displayed. The reputation data 108 includes, but is not limited to, feedback data, review data, earnings data and other data as desired.

The order in which the search results are displayed depends on a total score which is a combination of a search score for the search results of the profile and a reputation score for the reputation data 108. The combined score can be formed using a simple mathematical summation, a weighted summation or any predetermined means for forming a composite score. In some embodiments, the search results of the profile account for half of the total score and the reputation data 108 account for the other half of the total score for determining the order of the results. In alternative embodiments, other point schemes are used for determining the order of the results.

The search score for the search results of the service provider profile depends on where the text searched for is found. As shown in FIG. 2, the profile includes a "tagline" section, a "summary" section, an "experience" section, a "skills" section, a "keyword" section, an "about us" section, a "detailed description" section, a "certification" section and other sections. In some embodiments, more or less sections are included. Each section has a value, and that value is applied toward the search score, if the searched text is found within that section. The value for each section can be different. For example, if the searched text is found in the "skills" section, it is possible that this information is more valuable than if the searched text is found in the "about us" section. If the information is more valuable, the resulting score can result is a higher search score. Moreover, in some embodiments, additional details are taken into consideration to determine the search score, such as the number of years of experience with a certain skill, so that the more years a person or company has with a certain skill, the higher search score they will receive. The number of times the searched text is found is also able to contribute to a higher search score.

For example, the user searches for service providers using the text "Ajax." A first service provider includes Ajax in its "tagline," "skills" and "work experience" sections, with 5 years of work experience with Ajax, and would thus receive a search score accordingly. A second service provider only includes Ajax in its "about us" section and would thus receive a lower search score than the first service provider. Assuming their reputation scores are equal, the first service provider would be listed first or at the top of the list and the second service provider would be listed below.

In some embodiments, a reputation score for reputation data 108 is computed similarly to the search score. As described above, the reputation data 108 is able to include components including, but not limited to, feedback data, review data, earnings data, frequency of visits, most recent visit, number of projects completed and other data. In some embodiments, more or less data is included in the reputation data 108. The components of the reputation data 108 are weighted so that some of the components are more important while others are less important, which results in different reputation scores. For example, a feedback rating of 100% positive can be weighted heavier than the frequency of visits to the site. Some components are correlated in determining the reputation score for the reputation data 108. For example, a feedback rating and the quantity of reviews are related such that a feedback rating of 100% is more valuable when there have been 20 reviews versus 1 review.

In other embodiments, each component is weighted twice: one based on a category weight and the other based on a component weight. Specifically, similar components are grouped into same categories. Each category has a category weight or percentage that contributes to the reputation score. The weight assigned for each category is variable and adjustable. Preferably, the more important the category is, the higher the category weight. Alternatively, all categories are weighted equally. More or less categories that contribute to the reputation score are possible. In all embodiments, all category weights together account for 100% of the reputation score.

Each component within a category has a component weight that contributes to the category score. The weight assigned for each component within the category is variable and adjustable. Similarly, the more important the component is, the higher the component weight. Alternatively, all components within the category are weighted equally. More or less components that contribute to the category score are possible. In all embodiments, all component weights within the category together account for 100% of the category score.

FIGS. 3-5 illustrate three tables of the exemplary categories and their grouped components. The first category is "customer satisfaction," and its category score accounts for 25% of the reputation score. The second category is "earnings," and its category score accounts for 65% of the reputation score. The third category is "participation," and its category score accounts for 10% of the reputation score. As such, the "earnings" category is more important than the "customer satisfaction" category and the "participation" category, because the "earnings" category has the highest category weight. The three categories together account for 100% of the reputation score. As mentioned above, other categories are possible. If categories are included or removed, then the weight of each category is adjusted such that the total weight of all categories account for 100% of the reputation score.

As illustrated in a table 300 of FIG. 3, the "customer service" category comprises four components, as shown in a "Customer Satisfaction Components" column 305, that together account for 100% of its category score. As shown in a "Component weight" column 310, an "Average Six Months Feedback" component 335 accounts for 50% of the first category score, an "Average All Time Feedback" component 340 accounts for 30% of the first category score, a "Percent Repeat" component 345 accounts for 10% of the first category score, and a "Number of Feedbacks" component 350 accounts for 10% of the first category score. The "Average Six Months Feedback" component 335 is of the highest importance within the first category, because it is given the highest weight. As mentioned above, other components within the first category are possible. If components are included or removed within the first category, then the weight of each component is adjusted such that the total weight of all the components account for 100% of the first category score, which in turn accounts for 25% of the reputation score.

Since the four components under the "customer satisfaction" category together, in turn, account for 25% of the reputation score, each component accounts for a maximum possible percentage of the reputation score. The maximum possible percentage for each component is shown in a "Maximum Possible" column 320. The maximum possible percentage for a component is derived by multiplying the "customer service" category weight (25%) to the component weight. As such, a maximum possible percentage for the "Average Six Months Feedback" component 335 is 12.5% (25%×50%). A maximum possible percentage for the "Average All Time Feedback" component 340 is 7.5% (25%×30%). A maximum possible percentage for the "Percent Repeat" component 345 is 2.5% (25%×10%). A maximum possible percentage for the "Number of Feedback" component 350 is 2.5% (25%×10%).

For each component under the "customer satisfaction" category, a relative ranking is shown in a "Relative Ranking" column 315, and a final contribution is shown in a "Final Contribution" column 325. The final contribution for a component represents a percentage of the reputation score contributed by the service provider, and is derived by multiplying the relative ranking to the maximum possible percentage. For example, a relative ranking for the "Average Six Months Feedback" component 335 is 99%, which means that the service provider ranks higher than 99% of all service providers in terms of feedback received within the last six months. A final contribution for the "Average Six Months Feedback" component 335 is 12.4% (12.5%×99%). A relative ranking for the "Average All Time Feedback" component 340 is 99%, which means that the service provider ranks higher than 99% of all service providers in terms of feedback received for all times. A final contribution for the "Average All Time Feedback" component 340 is 7.4% (7.5%×99%). A relative ranking for the "Percent Repeat" component 345 is 17%, which means that 17% of the service provider's customers are repeat customers. A final contribution for the "Percent Repeat" component 345 is 0.4% (2.5%×17%). A relative ranking for the "Number of Feedbacks" component 350 is 30%, which means that 30% of service buyers whom the service provider had worked for in the past gave the service provider feedback. A final contribution for the "Number of Feedbacks" component 350 is 0.8% (2.5%×30%). Accordingly, a total final contribution 330 from the first category towards the reputation score, which is derived by adding together the final contribution for each component under the "customer satisfaction" component, is 21%. If the service provider had a perfect relative ranking (i.e. 100%) for each customer satisfaction component, then the total contribution 330 would have been 25%, which is the maximum contribution from the first category towards the reputation score.

As illustrated in a table 400 of FIG. 4, the "earnings" category comprises two components, as shown in an "Earnings Components" column 405, that together account for 100% of its category score. As shown in a "Component Weight" column 410, a "Six Months Earnings" component 435 accounts for 60% of the second category score, and an "All Time Earnings" component 440 accounts for 40% of the second category score. The "Six Months Earnings" component 435 is of the highest importance within the first category, because it is given the highest weight. As mentioned above, other components within the second category are possible. If components are included or removed within the second category, then the weight of each component is adjusted such that the total weight of all the components account for 100% of the second category score, which in turn account for 65% of the reputation score.

Since the two components under the "earnings" category together, in turn, account for 65% of the reputation score, each component accounts for a maximum possible percentage of the reputation score. The maximum possible percentage for each component is shown in the "Maximum Possible" column 420. The maximum possible percentage for a component is derived by multiplying the "earnings" category weight (65%) to the component weight. As such, a maximum possible percentage for the "Six Months Earnings" component 435 is 39% (65%×60%). A maximum possible percentage for the "All Time Earnings" component 440 is 26% (65%×40%).

For each component under the "earnings" category, a relative percentile is shown in a "Relative Percentile" column 415, and a final contribution is shown in the "Final Contribution" column 425. The final contribution for a component represents a percentage of the reputation score contributed by the service provider, and is derived by multiplying the relative percentile to the maximum possible percentage. For example, a relative percentile for the "Six Months Earnings" component 435 is 100%, which means that the service provider is the top earner among all service providers for the past six months. A final contribution for the "Six Months Earnings" component 435 is 39% (39%×100%). A relative percentile for the "All Time Earnings" component 440 is 100%, which means that the service provider is the top earner among all service providers for all times. A final contribution for the "All Times Earning" component 440 is 26% (26%×100%). Accordingly, a total final contribution 430 from the second category towards the reputation score, which is derived by adding together the final contribution for each component under the "earnings" category, is 65%. If the service provider did not have a perfect relative percentile (i.e. 100%) for each earnings component, then the total contribution 430 would not have been 65%, which is a maximum contribution from the second category towards the reputation score.

As illustrated in a table 500 of FIG. 5, the "participation" category comprises three components, as shown in a "Participation Components" column 505, that together account for 100% of its category score. As shown in a "Component Weight" column 510, a "Number of Violations Verified" component 535 accounts for 33.3% of the third category score, a "Number of Credentials Verified" component 540 accounts for 33.3% of the third category score, and a "Number of Skills Tested Positively" component 545 accounts for 33.3% of the third category score. Each of the three components is of equal importance because the same weight is given to all three components. As mentioned above, other components within the third category, such as an "Activity Level" component, a "Number of Disputes Lost" component, and a "Bid-Win Ratio" component, are possible. If components are included or removed from the third category, then the weight of each component is adjusted such that the total weight of all the components account for 100% of the third category score, which in turn account for 10% of the reputation score.

Since the three components under the "participation" category together, in turn, make up 10% of the reputation score, each component accounts for a maximum possible percentage of the reputation score. The maximum possible percentage for each component is shown in a "Maximum Possible" column 520. The maximum possible percentage for a component is derived by multiplying the 'participation' category weight (10%) to the component weight. As such, a maximum possible percentage for the "Number of Violations Verified" component 535 is 3.3% (10%×33%). A maximum possible percentage for the "Number of Credentials Verified" component 540 is 3.3% (10%×33%). A maximum possible percentage for the "Number of Skills Tested Positively" component 545 is 3.3% (10%×33%).

For each component under the "participation" category, a relative position is shown in a "Relative Position" column 515, and a final contribution is shown in a "Final Contribution" column 525. The final contribution for a component represents a percentage of the reputation score contributed by the service provider, and is derived by multiplying the service provider's relative position to the maximum possible percentage. For example, a relative position for the "Number of Violations Verified" component 535 is 0%, which means that the service provider has no verified violations within the services exchange medium. A final contribution for the "Number of Violations Verified" component 535 is 0% (3.3%×0%). A relative position for the "Number of Credentials Verified" component 540 is 100%, which means that the service provider has credentials that are all verified. A final contribution for the "Number of Credentials Verified" component 540 is 3.3% (3.3%×100%). A relative position for "Number of Skills Tested Positively" component 545 the 0%, which means that the service provider has no skills that are tested positively within the services exchange medium. A final contribution for the "Number of Skills Tested Positively" component 310 is 0% (3.3%×0%). Accordingly, a total final contribution 530 from the third category towards the reputation score, which is derived by adding together the final contribution for each component under the "participation" category, is 3.3%. If the service provider had a perfect relative position (e.g. 100%) for each participation component, then the total contribution 530 would be 10%, which is a maximum contribution from the third category towards the reputation score.

The reputation score is determined by adding together the first category's total final contribution 330, the second category's total final contribution 430, and the third category's total final contribution 530. As such, the service provider's reputation score is 89.3% (21%+65%+3.3%). The reputation score is a quantitative metric which represents the service provider's reputation. It should be apparent to those of ordinary skill in the art that the categories, the components and associated weights as illustrated in FIGS. 3-5 are for discussion purposes only and that other categories, other components, and other associated weights are possible. In some embodiments, the associated weights are variable and adjustable.

By combining the search score and the reputation score, a total score is determined which is used to generate a list of results ordered based on the total score. Since reputation is an important attribute when choosing a service provider, the list is ordered in a significant manner useful to users when the reputation score is combined with the search score. As such, the list provides the users with matches that are most capable of providing high quality service, descending to those that are not as capable according to reputation. The users are then able to scroll down the list of results to pick the person or company that best suits their needs.

The list of results is also able to be refined further using the refine results components 104. The refine results components 104 are able to include links, scroll bars, text boxes and/or any other user interface element. For example, the refine results components 104 include links to limit the results that are only within a certain category. Scroll bars limit the results to only those with feedback above a certain percentage, the number of reviews above a certain amount, and an hourly rate up to a certain price. A location text box limits the results to those within a certain geographical area. As each refine results component 104 is used, the list of results changes to only include those that also meet the refine results criteria.

FIG. 2 illustrates an exemplary web page 200 of a service provider profile in accordance with the present invention. Typically, the service provider profile describes the service provider's professional abilities and expertise. The web page 200 includes sections which contain data such as searchable text. A "tagline" section 202 is displayed below a service provider's name on the profile page 200 and also on the results page 100. The "tagline" section 202 includes items that are intended to be highlights for the service provider. A "summary" section 204 includes a brief description of the service provider. An "experience" section 206 includes fields of experience and the number of individuals with experience in the fields. A "keyword tag" section 208 includes keywords designated by a user. A "skills" section 210 includes a list of skills and years of experience for each skill. An "about us" section 212 includes a description about the service provider. A "detailed service description" section 214 provides a more in-depth description of the service provider. A "credentials" section 216 includes references, qualifications and certifications related to the service provider. Each section is assigned a value for computing a search score which is used in ordering results of a search. The value depends on how important the section is, as determined by the site operator.

For example, the site operator designates text found in the "tagline" section 202 and the "keyword" section 208 as the most important. Text found in the "skills" section 210 is next on the importance list, followed by the "experience" section 206. Text found in the other sections is considered the least important. Furthermore, in some embodiments, some text is dependent on other data such as text found in the "skills" section 210 which has its value modified by the amount of years experience for that skill. Thus, a skill of Ajax with 1 year experience is rated as not as valuable as 3 years of experience.

FIG. 6 illustrates a flowchart 600 of a method of searching for a service provider in accordance with the present invention. In the step 605, one or more skills are searched for in service provider profiles. In some embodiments, the one or more skills are searched for using a web site search engine by entering a text string to search for. In the step 610, the one or more skills are matched with text within the service provider profiles to produce search scores. The search scores are based on matches between the one or more skills and the text. In some embodiments, the matches are weighted. As described above, the location of the matches and other factors determine the value of the matches. In the step 615, reputation scores are generated for the reputation data within the service provider profiles. In some embodiments, the reputation data include feedback data, review data, earnings data, duration data, visitation data and project completion data. Typically, the reputation components is weighted. In some embodiments, the reputation components are weighted twice, as described above. In some embodiments, the step 615 is able to be performed before the step 605. Alternatively, the step 615 is able to be performed concurrently with the step 610. In the step 620, a list is generated of the service providers. The service providers are ordered as functions of the search scores and reputation scores. In some embodiments, the order is a descending order with the service provider with a highest combination of the search scores and the reputation scores atop the list of service providers. In some embodiments, the search scores and the reputation scores are weighted equally. In some embodiments, the list of service providers is displayed, in the step 625. In some embodiments, each reputation component and at least a portion of the service provider profiles are displayed within the list of service providers. In some embodiments, each reputation component is viewable by the service providers. In some embodiments, the list of service providers is available for viewing by the service providers. In some embodiments, the list is able to be refined using refining components, in the step 630. The list is able to be refined at any time once the list is generated. The list is able to be refined any number of times.

Figure 7:
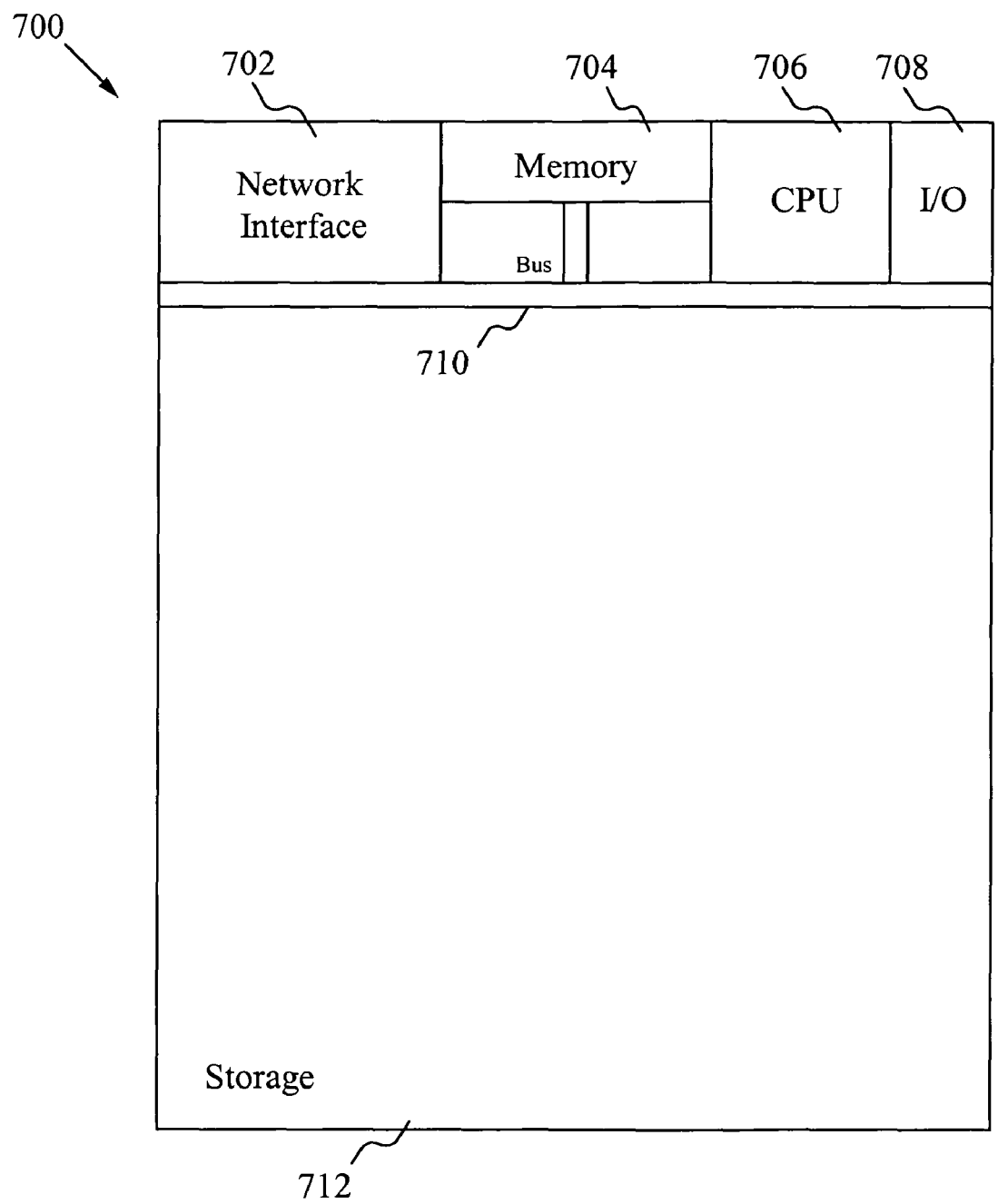
FIG. 7 illustrates a graphical representation of an exemplary computing device in accordance with the present invention.

FIG. 7 illustrates a graphical representation of an exemplary computing device 700 in accordance with the present invention. The computing device 700 can be used to store, serve, compute, communicate and/or display information to enable users to search, sort, view and select service providers. For example, a computing device 700 such as a server or a set of servers, hosts a website which stores and serves information related to service providers including profile information and reputation data. If there is a set of servers, they can be co-located or geographically dispersed. Continuing with the example, a different computing device such as a personal computer is used by users who need a service provider to provide a service such as design a website. The users use their computer to interact with the website which allows them to search for and select a service provider as well as perform other tasks. In general, a hardware structure suitable for implementing the computing device includes a network interface 702, a memory 704, processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include one or more of a hard drive, CDROM, CDRW, DVD, DVDRW, flash memory card and any other storage device. The computing device is able to include one or more network interfaces 702. An example of a network interface includes a network card connected to an Ethernet or other type of LAN. The I/O device(s) 708 are able to include one or more of the following: keyboard, mouse, monitor, display, printer, modem and other devices. Software used to perform the methods of the present invention are likely to be stored in the storage device 712 and memory 704 and processed as applications are typically processed.

Examples of suitable computing devices include a personal computer, laptop computer, computer workstation, a server, mainframe computer, mini-computer, handheld computer, personal digital assistant, cellular/mobile telephone, smart appliance, gaming console or any other suitable computing device.

There are multiple aspects of utilizing the method and system for ranking users. From a service buyer's perspective, the service buyer is able to search for a service provider to perform a desired task. The service buyer enters in a search text, for example, a programming skill such as Javascript, and based on the search results and reputation results, service providers are ranked and listed accordingly. The service buyer is then able to select the most appropriate service provider for the service buyer's needs. From a service provider's perspective, the service provider is aware that his/her reputation is a factor in determining where they are ranked and listed when a service buyer searches. Where the service provider appears on a list is able to have an effect on how often the service provider is selected to provide a service which ultimately determines profitability for the service provider. Thus, service providers will likely perform necessary actions to maintain a high reputation, so that they are highly ranked when searched for. This forces service providers to act appropriately, for example, providing quality service, responding to service buyers' questions, in addition to other actions.

In operation, the method and system for ranking users enables service buyers to easily search for a best matching service provider. The method and system also enable behavioral guidance of service providers since the service providers are aware that their reputation determines their ranking. The method and system implement a search which ranks service providers based on weighted textual search results and weighted reputation results. The weighted textual search results depend on where text is found, how many times and other factors used in determining a score for the search results. The weighted reputation results depend on many factors such as reviews, earnings, duration on the site and additional factors. Since service providers are aware that their reputation affects where they are ranked, the reputation influences their behavior on the site. This ranking impact essentially motivates the service providers to perform well or to be accept a poor ranking.

The following is an example of utilizing the method and system for ranking users. Service Provider X generates his profile which includes skills of Javascript, Java and web site design as well as job experience of Javascript for 3 years, Java for 2 years and web site design for 3 years. Initially, when service buyers search for text such as Java, Service Provider X will be listed below others who have an established positive reputation, but above those who have a negative reputation. Since the search results are taken into account too, others with more years experience in Java will also likely appear ahead of Service Provider X, assuming their reputation is not too tarnished. As Service Provider X is hired for more and more work, assuming he performs well and does what is required as a service provider, his reputation will increase. Furthermore, since Service Provider X is aware that his reputation increases as he performs well which results in him being ranked higher, Service Provider X will ensure he performs well and meets the expectations of any service buyers who purchase his services. Thus, the method and system for ranking users influences the behavior of the service providers and ensures service providers provide quality service. Unlike, sites which list service providers solely based on earnings which simply rewards service providers who are able to do a lot of work or are hired for expensive work, a method and system for ranking users based, in part, on reputation truly encourages quality service.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the appended claims.

What is claimed is:

1. A non-transitory computer-readable medium storing instructions that, when executed by a computing device, cause the computing device to perform a method of searching for a service provider to provide a service in response to a search text string comprising one or more skills, the method comprising:
   a. searching a plurality of fields of each service provider profile in a database of service provider profiles for each of the one or more skills;
   b. matching the one or more skills with text within the plurality of fields of each service provider profile to produce a search score for a service provider matching at least one skill;
   c. calculating a reputation score for each service provider, wherein the reputation score is dependent on final contribution values computed based on reputation data within a service provider profile belonging to a service provider, wherein each reputation datum is associated with a category having a category weight and with a component weight, wherein each final contribution value is dependent on the component weight, the category weight, and a relative position value of the service provider for the reputation datum, wherein each final contribution value represents a percentage of the reputation score contributed by the service provider and is derived by multiplying a relative position of the service provider to a maximum percentage, wherein the maximum percentage is derived by multiplying a category weight to a component weight; and
   d. generating a list of service providers ordered based on a total score, the total score is determined by combining the search score and the reputation score.

2. The non-transitory computer-readable medium of claim 1 wherein the search score is based on matches between the one or more skills and the text within the plurality of fields of the service provider profile belonging to the service provider.

3. The non-transitory computer-readable medium of claim 2 wherein the matches are weighted.

4. The non-transitory computer-readable medium of claim 2 wherein the matches are weighted more when a skill of the one or more skills is within one of a tagline section, a skills section, a keyword tag section, an experience section and a credentials section than when the skill is in one of a description section, a summary section and an about us section.

5. The non-transitory computer-readable medium of claim 1 wherein the search score and the reputations score are weighted equally.

6. The non-transitory computer-readable medium of claim 1 wherein the reputation data comprise components including at least one of feedback data, review data, earnings data, duration data, visitation data and project completion data.

7. The non-transitory computer-readable medium of claim 6 wherein a portion of the components are correlated in determining the reputation score.

8. The non-transitory computer-readable medium of claim 6 wherein the components are weighted.

9. The non-transitory computer-readable medium of claim 6 wherein the components are grouped into categories, wherein the categories are weighted, wherein a total weight of all components associated with a category account for 100% of that category, wherein a total weight of all categories account for 100% of the reputation score.

10. The non-transitory computer-readable medium of claim 6 wherein each component and at least a portion of the service provider profiles are displayed within the list of service providers.

11. The non-transitory computer-readable medium of claim 6 wherein each component is viewable by the service providers.

12. The non-transitory computer-readable medium of claim 1 wherein the list of service providers is ordered in descending order with the service provider with a highest combination of the search score and the reputation score atop the list of service providers.

13. The non-transitory computer-readable medium of claim 1 wherein the list of service providers is viewable by the service providers.

14. The non-transitory computer-readable medium of claim 1 further comprising refining the list of service providers.

15. The non-transitory computer-readable medium of claim 1, wherein calculating a reputation score for each service provider comprises:
   a. for each reputation datum within a category, determining a final contribution value by multiplying together the category weight of the reputation datum, the component weight of the reputation datum, and the relative standing value of the service provider for the reputation datum, wherein the relative standing value is a position of the service provider with respect to other service providers; and
   b. adding together final contribution values to determine the reputation score of the service provider.

16. A method of providing a list of service providers on a computing device, the method comprising:
   a. accessing a database of service providers, each service provider having a service provider profile, and determining a reputation score for each service provider;
   b. providing a first user interface to allow entry of one or more skills;
   c. matching the one or more skills to a plurality of fields of each service provider profile in the database of service provider profiles to produce a search score for each service provider;
   d. calculating a reputation score for each service provider, wherein the reputation score is dependent on final contribution values computed based on reputation data within a service provider profile belonging to a service provider, wherein each reputation datum is associated with a category having a category weight and with a component weight, wherein each final contribution value is dependent on the component weight, the category weight, and a relative position value of the service provider for the reputation datum, wherein each final contribution value represents a percentage of the reputation score contributed by the service provider and is derived by multiplying a relative position of the service provider to a maximum percentage, wherein the maximum percentage is derived by multiplying a category weight to a component weight;
   e. generating a list of service providers ordered based on a total score, the total score is determined by combining the search score and the reputation score; and
   f. displaying the list of service providers.

17. The method of claim 16 wherein the search score is based on weighted matches of the one or more skills and the text within each of the plurality of fields of the service provider profiles belonging to the service provider.

18. The method of claim 16 wherein the reputation data are categorized, wherein each category is weighted and each component within a category is weighted.

19. The method of claim 18 further comprising providing a second user interface to allow refining a list of service providers.

20. A system for presenting a list of service providers to perform a task comprising:
   a. a processor; and
   b. an application executed by the processor, the application configured to:
      i. search for one or more skills within a plurality of fields of a service provider profile of each service provider in a database of service providers;
      ii. match the one or more skills with text within service provider profiles to produce a search score for each service provider;
      iii. calculate a reputation score for each service provider, wherein the reputation score is dependent on final contribution values computed based on reputation data within a service provider profile belonging to a service provider, wherein each reputation datum is associated with a category having a category weight and with a component weight, wherein each final contribution value is dependent on the component weight, the category weight, and a relative position value of the service provider for the reputation datum, wherein each final contribution value represents a percentage of the reputation score contributed by the service provider and is derived by multiplying a relative position of the service provider to a maximum percentage, wherein the maximum percentage is derived by multiplying a category weight to a component weight; and
      iv. generate a list of service providers ordered based on a total score, the total score is determined by combining the search score and reputation score.

21. The system of claim 20 wherein the application is executed online.

22. The system of claim 20 wherein the search score is based on matches between the one or more skills and the text in each of the plurality of fields of the service provider profile.

23. The system of claim 21 wherein the matches are weighted.

24. The system of claim 21 wherein the matches are weighted more when a skill of the one or more skills is within one of a tagline section, a skills section, a keyword tag section, an experience section and a credentials section than when the skill is in one of a description section, a summary section and an about us section.

25. The system of claim 20 wherein the search score and the reputations score are weighted equally.

26. The system of claim 20 wherein the reputation data comprise components including at least one of feedback data, review data, earnings data, duration data, visitation data and project completion data.

27. The system of claim 26 wherein a portion of the components are correlated in determining the reputation score.

28. The system of claim 26 wherein the components are weighted.

29. The system of claim 26 wherein the components are grouped into categories, wherein the categories are weighted.

30. The system of claim 26 wherein each component and at least a portion of the service provider profiles are displayed within the list of service providers.

31. The system of claim 26 wherein each component is viewable by the service providers.

32. The system of claim 20 wherein the list of service providers is ordered in descending order with the service provider with a highest combination of the search score and the reputation score atop the list of service providers.

33. The system of claim 20 wherein the list of service providers is viewable by the service providers.

34. The system of claim 20 further comprising refining the list of service providers.

* * * * *